March 10, 1970
J. MAURICE
3,499,512
DIAPHRAGM CLUTCH
Filed March 11, 1968
2 Sheets-Sheet 1
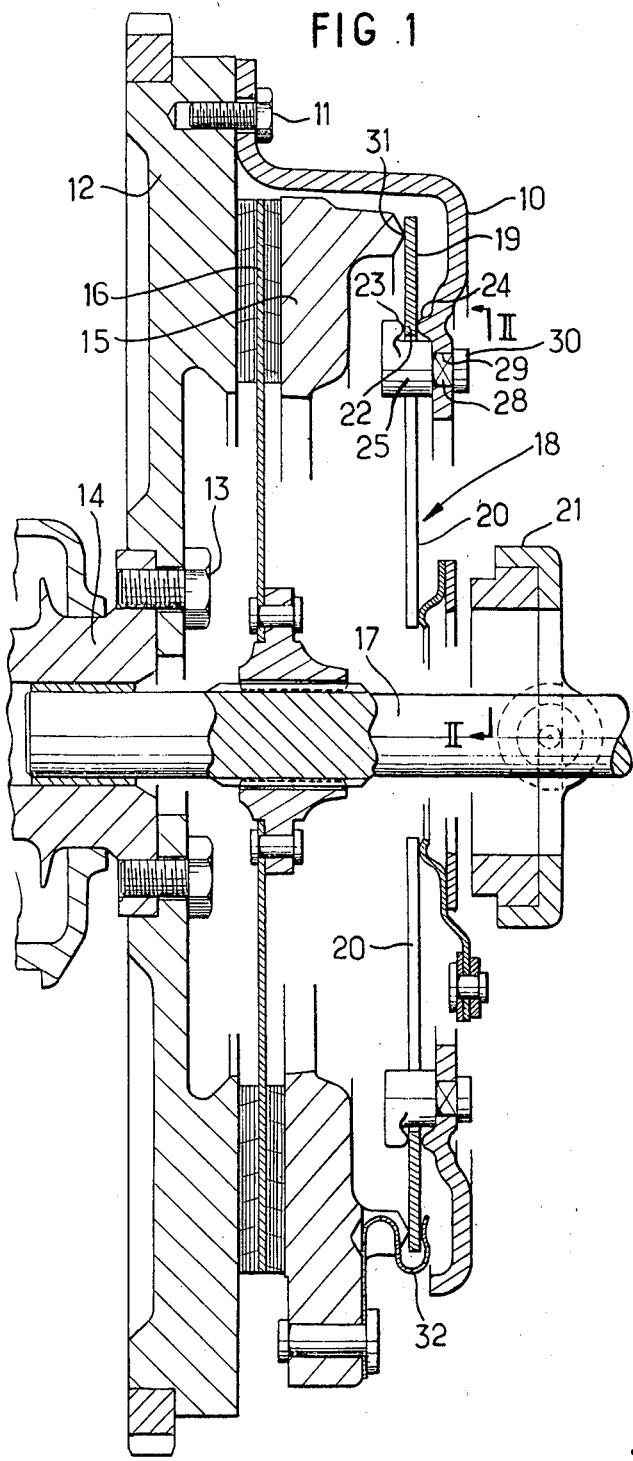
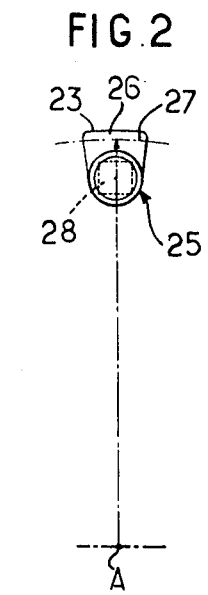
INVENTOR
JEAN MAURICE
By Young & Thompson
ATTYS.

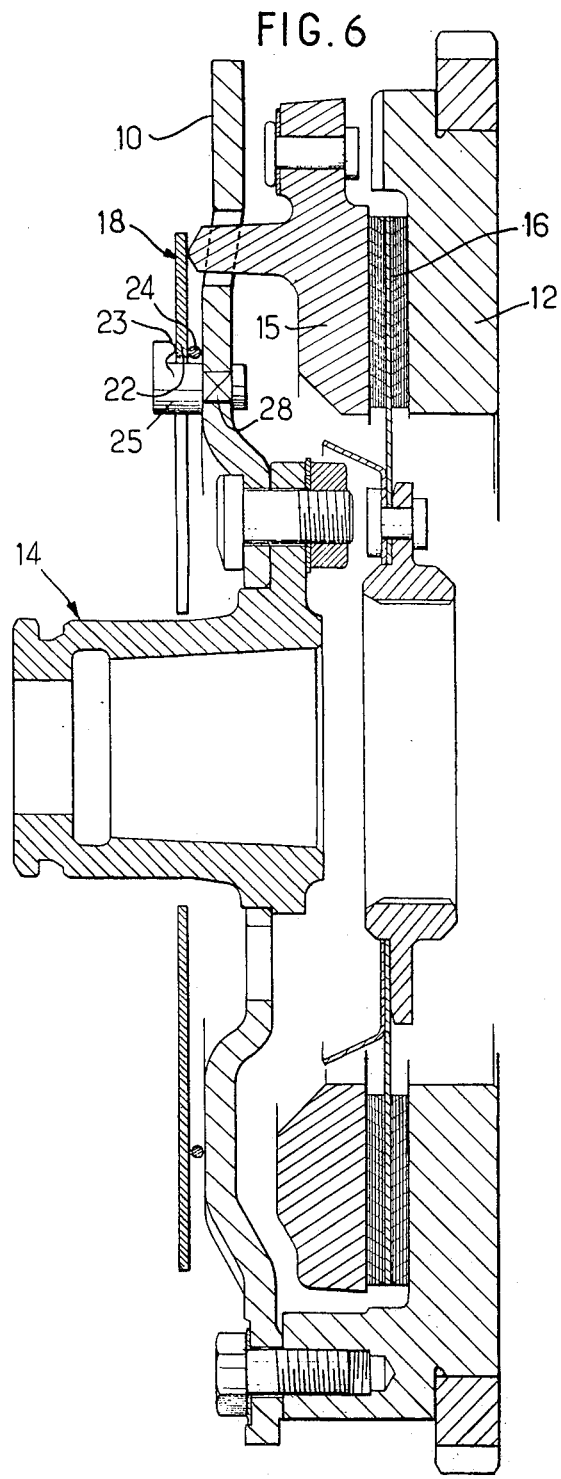
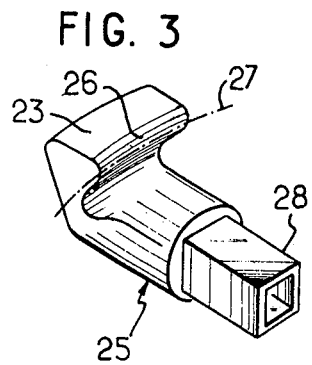
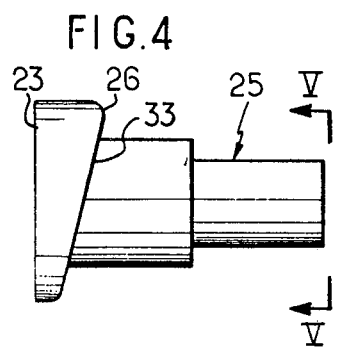
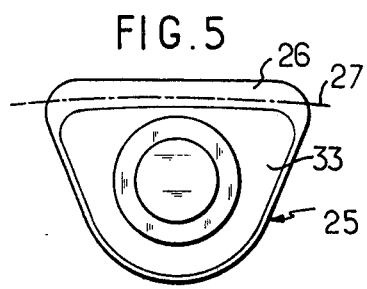

United States Patent Office 3,499,512
Patented Mar. 10, 1970

3,499,512
DIAPHRAGM CLUTCH
Jean Maurice, Paris, France, assignor to Societe Anonyme Francaise du Ferodo, Paris, France, a French company
Filed Mar. 11, 1968, Ser. No. 712,046
Claims priority, application France, Mar. 31, 1967, 100,940
Int. Cl. F16d *13/44;* F16b *19/04*
U.S. Cl. 192—89                                    16 Claims

ABSTRACT OF THE DISCLOSURE

A diaphragm clutch of the kind in which the diaphragm has a continuous peripheral portion forming a dished clamping washer and a central portion having a plurality of radial slits defining a series of fingers adapted to co-operate with a declutching stop, an annular rocking zone being formed by said continuous portion in the vicinity of the slit central portion, said zone being interposed between two supports which are slightly spaced apart in a direction parallel to the axis and which are coupled to a cover rigidly fixed to one of the clutchplates, wherein at least one of the two supports is constituted by a series of isolated pillars which are fixed to said cover and which are distributed along a circumference, said diaphragm-rocking zone being permitted to bear directly against said pillars.

---

The present invention relates to a diaphragm clutch in which the diaphragm has a continuous peripheral portion forming a Belleville clamping washer, and a split central portion defining a series of fingers adapted to co-operate with a declutching stop, an annular rocking zone being formed by the continuous portion in the vicinity of the slit portion, and being inserted between two supports which are slightly spaced apart in a direction parallel to the axis, and which are coupled to a cover rigidly fixed to a first clutch plate, while an annular thrust zone arranged at the periphery of the continuous portion is intended to co-operate with a second clutch plate, in such manner that when the declutching stop has no action on the said fingers, the continuous portion is applied against one of the said supports and pushes elastically against the second plate so as to cause the engagement of the clutch, and so that when the stop acts on the said fingers, the diaphragm rocks while passing into application against the other support, which causes the elastic action on the second plate to cease and releases the clutch.

In general, that of the two supports in the vicinity of the cover which is farthest away from the said cover is constituted by a continuous annular keeper-ring positioned by means of pillars uniformly distributed along a circumference and fixed to the cover.

When the clutch is in a stage of operation at which the diaphragm is applied against the other support, that is to say that which is the closer to the cover, the above-mentioned keeper-ring is freed to a certain extent and is capable of movements and/or vibrations which may give rise to noise and wear. This condition can be remedied by means adapted to hold the ring stationary, but this results in a complication of the construction.

The applicant has sought to find if it would be possible to overcome these drawbacks by eliminating the part which causes them, namely the keeper-ring. However, if this is done, the circular continuity of the support is interrupted at the same time, which may result in poorer conditions of rocking of the diaphragm. A large number of tests carried out by the applicant have shown that this was not the case and that in the absence of the keeper-ring the operation was satisfactory, and could even be made excellent by means of an appropriate adaptation of the pillars.

The present invention has for its object a diaphragm clutch of the kind referred to, especially characterized in that at least one of the supports adjacent to the cover, particularly that of the two supports which is farthest from the cover, is constituted by a series of isolated supporting elements distributed along a circumference, each supporting element consisting of a pillar head fixed to the cover, against which head the rocking area of the diaphragm is permitted to be directly applied.

This arrangement results in a simplification of the construction and a reduction of the production cost, at the same time providing silent operation which is satisfactory from all points of view.

According to a further characteristic feature, the pillar head comprises a projecting portion adapted to localize the supporting contact between the head and the rocking zone of the diaphragm. The projecting portion is preferably such that the supporting contact is substantially linear and has advantageously the form of a circular arc centered on the axis of the clutch, in such manner that this line of contact is itself centered on the said axis.

In one form of embodiment, the fixing of the pillar to the cover is such that it ensures complete rigidity and that in particular it retains the pillar in an angular position, in which the arcuate bead is centered with respect to the axis of the clutch. This fixing comprises for example a square section rod on the pillar which is engaged in a hole, also of square section, in the cover.

The support which is closer to the cover can be constituted by a thicker portion of the cover in the form of a continuous or non-continuous annular bead, or again by an annular keeper-ring interposed between the diaphragm and the cover and passing around all the pillars.

In one form of embodiment, the diaphragm is arranged between the second plate and the cover, while in an alternative form, the cover is arranged between the second plate and the diaphragm.

Forms of embodiment of the invention are described below by way of example, reference being made to the accompanying drawings, in which:

FIG. 1 is a view in longitudinal section of a diaphragm clutch in accordance with the invention;

FIG. 2 is a view of a pillar alone in elevation, taken along the line II—II of FIG. 1;

FIG. 3 is a view in perspective of the pillar;

FIG. 4 is a view to a larger scale of an alternative form of pillar;

FIG. 5 is a view of this alternative pillar taken along the arrows V—V of FIG. 4;

FIG. 6 relates to an alternative form of diaphragm clutch.

In the form of embodiment shown in FIGS. 1 to 3, a clutch of the diaphragm type comprises a cover 10 adapted to be fixed by screws 11 to a reaction plate 12 which is fixed in turn by screws 13 to a driving shaft 14. A pressure-plate 15 is mounted so as to be axially movable and fixed for rotation with respect to the cover 10 by any appropriate means (not shown) such as tenons and mortices, elastic driving tongues, etc. The plates 12 and 15 are intended to grip between them a friction disc 16 coupled to a receiving shaft 17.

The pressure-plate 15 co-operates with a diaphragm 18. This diaphragm has a continuous peripheral portion 19 forming a Belleville clamping washer, and a slit central portion forming a series of fingers 20 adapted to co-operate with a declutching stop 21.

An annular rocking zone 22 is formed by the continuous portion 19 in the vicinity of the fingers 20, and is inserted between two supports 23 and 24, which are slightly spaced apart in an axial direction and which are coupled to the cover 10.

The support 23 which is the farthest away from the cover 10 is constituted by a series of isolated supporting elements distributed along a circumference, and each consisting of a pillar head 25 fixed to the cover 10. The pillar 25 is preferably manufactured by die pressing.

The head 23 of the pillar 25 comprises a projecting portion (see FIG. 3), especially in the form of a bead 26 adapted to localize a linear contact 27 for supporting the zone 22 during declutching. The bead 26 has the shape of a circular arc, as shown in FIGS. 2 and 3, centered on the axis A of the clutch (FIG. 2) so that the line of contact 27 is itself centered on the axis A.

The pillar 25 has a fixing rod 28 of square section which is engaged in a hole 29, also of square section, in the cover 10 and which is riveted at 30. In this way, the fixing of the pillar 25 to the cover 10 is such as to ensure a completely rigid fixing and in particular it maintains the pillar 25 at an angular position at which the arcuate bead 26 remains centered with respect to the axis A.

The other support 24 is constituted by a thickened portion of the cover 10 in the form of a continuous or non-continuous annular bead.

The part 19 of the diaphragm 18 is provided, in the immediate vicinity of the periphery, with an annular thrust zone 31 intended to co-operate with the plate 15.

When the abutment 21 has no action on the fingers 20, the zone 22 of the diaphragm is applied against the support 24 and pushes elastically against the plate 15 at 31 so as to cause the engagement of the clutch.

When the declutching stop 21 acts on the fingers 20 towards the left of FIG. 1, the diaphragm rocks. The zone 22 passes into application against the support 23. The elastic action on the plate 15 ceases and, in the example shown, this plate is returned by hooks 32 coupled to the diaphragm. The clutch is then released.

From the above, the simple and convenient construction of the clutch according to the invention will be appreciated, particularly the mounting of the diaphragm in direct support on the heads 23 of the pillars, namely without the interposition of any intermediate member.

In the alternative form shown in FIGS. 4 and 5, the salient arcuate region 26 is formed, not by a bead, but by the apex of an oblique face 33. The rod 28 is round in this case, and is locked angularly by driving into a hole 29 which has been formed with a slight ovality.

In FIG. 3 as in FIGS. 4 and 5, the head 23 of the pillar 25 is formed in one piece together with the pillar.

In the example of FIG. 1, the diaphragm 18 is arranged between the plate 15 and the cover 10, and the heads 23 serve as supports during the phases of declutching.

It is however possible also to arrange the cover 10 between the plate 15 and the diaphragm 18, and to use the heads 23 as supports during the engagement phases, as shown in FIG. 6, to which reference will now be made.

In this case, the pillars 25 extend, not towards the interior of the clutch, but towards the outer side.

It will be observed from FIG. 6 that the support 24 consists of an annular keeper-ring interposed between the diaphragm 18 and the cover 10 and enclosing the whole of the pillars 25. The ring 24 may or may not be welded to the cover 10.

The arrangement and operation are furthermore similar to those which have been previously described, and the same reference numbers have been adopted to indicate similar elements.

The invention is not limited to the forms of construction described and shown, but includes all its alternative forms. For example, the invention is applicable not only to single-disc clutches, but also to double and multiple clutches. Means may be provided between the supports 23 and 24 to produce an axial grip for compensating play, and may consist for example of giving the ring 24 an oval, corrugated, tiled or other form. The rod 28 of the pillar may have a square or round section, also with any appropriate shape, such as polygonal, circular with a flat or the like, so as to prevent the rod from rotating. The keeper ring 24 of FIG. 6 may be adopted for FIG. 1, and the thickened portion 24 of FIG. 1 may be adopted for FIG. 6.

What I claim is:

1. In a diaphragm clutch in which the diaphragm has a continuous peripheral portion forming a Belleville clamping washer and a slit central portion defining a series of fingers adapted to cooperate with a declutching stop, an annular rocking zone being formed by the continuous portion in the vicinity of the slit portion and being interposed between two supports which are slightly spaced apart in a direction parallel to the axis and which are coupled to a cover rigidly fixed to a first clutch plate, while an annular thrust zone disposed at the periphery of the continuous portion is intended to cooperate with a second clutch plate in such manner that when the declutching stop has no action on said fingers, the continuous portion is applied against one of said supports and pushes elastically against said second plate so as to cause the engagement of the clutch, and so that when the stop acts on said fingers, the diaphragm rocks while passing into application against the other support, which causes the elastic action on said second plate to cease and releases the clutch, the improvement wherein at least one of the two said supports is constituted by a series of circumferentially separated rivet-like pillars each of which passes through a hole in said cover and is fixed to the cover about the margins of the hole, said pillars being distributed along a circumference, each of said pillars having an enlarged head axially spaced from said cover, and each head having a face confronting said diaphragm disposed at an acute angle to the axis of said clutch, said diaphragm rocking zone bearing directly against an edge of said face of said pillars.

2. A diaphragm clutch as claimed in claim 2, in which said at least one support is that of the two supports in the vicinity of the cover which is the farthest from said cover, and is constituted by the heads of said pillars.

3. A diaphragm clutch as claimed in claim 2, in which each said pillar head comprises a projecting region adapted to localize the supporting contact between the pillar head and the rocking zone of said diaphragm.

4. A diaphragm clutch as claimed in claim 3, in which said projecting region is formed in such manner that the supporting contact is substantially linear.

5. A diaphragm clutch as claimed in claim 3, in which said projecting region has the form of a circular arc centered on the axis of the clutch, whereby the linear supporting contact is in turn centered on said axis.

6. A diaphragm clutch as claimed in claim 3, in which said projecting region has the form of a bead.

7. A diaphragm clutch as claimed in claim 3, in which said projecting region is formed by the apex of an oblique cut face.

8. A diaphragm clutch as claimed in claim 2, in which the head of a pillar is formed in one piece with the body of said pillar.

9. A diaphragm clutch as claimed in claim 1, in which said pillars are fixed to the cover in such manner as to ensure completely rigid fixing and that in particular the pillar is fixed at an angular position at which the central arcuate region is centered with respect to the axis of said clutch.

10. A diaphragm clutch as claimed in claim 9, in which said fixation comprises a rod of square section on said pillar which is engaged in a hole, also of square section, in the cover.

11. A diaphragm clutch as claimed in claim 2, in which the support which is nearest to said cover is formed by a thickened portion of the cover in the form of a continuous or interrupted annular beading.

12. A diaphragm clutch as claimed in claim 2, in which the support which is nearest to said cover is constituted by an annular keeper-ring interposed between the diaphragm and the cover and enclosing all said pillars.

13. A diaphragm clutch as claimed in claim 1, in which said diaphragm is mounted between said second clutch plate and said cover.

14. A diaphragm clutch as claimed in claim 1, in which said cover is mounted between said second clutch plate and said diaphragm.

15. A diaphragm as claimed in claim 1, in which said holes are noncircular.

16. A diaphragm as claimed in claim 15, in which the portion of each pillar which is disposed in the hole has a noncircular cross-sectional configuration complementary to the noncircular shape of the hole.

References Cited

UNITED STATES PATENTS

| 2,630,897 | 3/53 | Porter. |
|---|---|---|
| 2,700,444 | 1/55 | Ahlen. |
| 3,213,999 | 10/65 | Smirl et al. |
| 3,283,864 | 11/66 | Motsch. |
| 3,300,007 | 1/67 | Motsch. |

FOREIGN PATENTS 1,961,405  4/61  Great Britain.

BENJAMIN W. WYCHE III, Primary Examiner

U.S. Cl. X.R.

85—37